(12) United States Patent
Manji et al.

(10) Patent No.: US 12,036,963 B2
(45) Date of Patent: Jul. 16, 2024

(54) WORK VEHICLE

(71) Applicant: Kubota Corporation, Osaka (JP)

(72) Inventors: Yasuhiro Manji, Sakai (JP); Nozomu Akiyama, Sakai (JP)

(73) Assignee: Kubota Corporation, Osaka (JP)

( * ) Notice: Subject to any disclaimer, the term of this patent is extended or adjusted under 35 U.S.C. 154(b) by 303 days.

(21) Appl. No.: 17/528,686

(22) Filed: Nov. 17, 2021

(65) Prior Publication Data

US 2022/0314954 A1    Oct. 6, 2022

(30) Foreign Application Priority Data

Mar. 30, 2021   (JP) ................... 2021-057065

(51) Int. Cl.
| | |
|---|---|
| *B60T 17/00* | (2006.01) |
| *B60T 8/92* | (2006.01) |
| *B60T 17/22* | (2006.01) |
| *B60Q 9/00* | (2006.01) |
| *B60T 13/74* | (2006.01) |

(52) U.S. Cl.
CPC .............. *B60T 17/221* (2013.01); *B60T 8/92* (2013.01); *B60Q 9/002* (2013.01); *B60T 13/743* (2013.01); *B60T 2240/00* (2013.01); *B60T 2270/406* (2013.01)

(58) Field of Classification Search
CPC ........ B60T 17/221; B60T 8/92; B60T 13/743; B60T 2240/00; B60T 2270/406; B60Q 9/002
USPC .......................................................... 701/23
See application file for complete search history.

(56) References Cited

U.S. PATENT DOCUMENTS

| | | |
|---|---|---|
| 6,708,805 B2 | 3/2004 | Samejima et al. |
| 10,850,622 B2 | 12/2020 | Matsuda et al. |
| 2003/0046915 A1 | 3/2003 | Samejima et al. |
| 2016/0244035 A1 | 8/2016 | Yasui |
| 2018/0148021 A1 | 5/2018 | Mannherz et al. |
| 2020/0172072 A1 | 6/2020 | Foerster et al. |

FOREIGN PATENT DOCUMENTS

| | | | |
|---|---|---|---|
| CN | 105745128 A | * | 7/2016 |
| CN | 108860119 A | | 11/2018 |
| DE | 102016223655 A1 | | 5/2018 |
| EP | 3470280 A1 | * | 4/2019 |

(Continued)

*Primary Examiner* — Tiffany P Young
(74) *Attorney, Agent, or Firm* — The Webb Law Firm (57) ABSTRACT

A self-driving work vehicle including a traveling apparatus, a vehicle body supported by the traveling apparatus on ground, a variable traveling power supply apparatus configured to supply rotational drive power to the traveling apparatus, a travel operation interface configured to adjust a rate of the rotational drive power, a parking brake provided for a transmission shaft of the variable traveling power supply apparatus, a rotation detector configured to detect rotation of the traveling apparatus or the transmission shaft, and a controller. The controller is configured or programmed to control the parking brake to a braking state or a non-braking state by a parking brake control module, and manage the braking state or the non-braking state as a vehicle body state by a condition management module. The braking state and the non-braking state are operating states of the parking brake.

7 Claims, 5 Drawing Sheets

(56) References Cited

FOREIGN PATENT DOCUMENTS

| | | | |
|---|---|---|---|
| JP | 09164943 A | * | 6/1997 |
| JP | 9164943 A | | 6/1997 |
| JP | 200372528 A | | 3/2003 |
| JP | 2005313755 A | | 11/2005 |
| JP | 2005343200 A | | 12/2005 |
| JP | 201574383 A | | 4/2015 |
| JP | 201943269 A | | 3/2019 |
| JP | 201975888 A | | 5/2019 |
| KR | 101713747 B1 | * | 10/2015 |
| WO | 2019037951 A1 | | 2/2019 |
| WO | WO-2019163595 A1 | * | 8/2019 |

* cited by examiner

WORK VEHICLE

CROSS REFERENCE TO RELATED APPLICATION

This application claims priority to Japanese Patent Application No. 2021-057065 filed Mar. 30, 2021, the disclosure of which is hereby incorporated by reference in its entirety.

BACKGROUND OF THE INVENTION

1. Field of the Invention

The present invention relates to a self-driving work vehicle.

2. Description of the Related Art

The U.S. Pat. No. 6,708,805 discloses a riding-type mowing machine including a transmission configured to supply engine output to a traveling apparatus, a brake pedal that operates a parking brake to brake the traveling apparatus, and a brake lever that operates a travel brake to brake the traveling apparatus. The parking brake and the travel brake are constituted by a shared brake device, and this brake device frictionally brakes a transmission shaft of a gear-type transmission mechanism constituting the transmission. The U.S. Pat. No. 10,850,622 discloses an electric traveling vehicle including a motor controller that controls an electric motor for traveling based on displacement of an operation interface (operation levers) between forward, neutral, and backward positions, and a brake controller that puts an electromagnetic brake in a released state or a braking state based on the operation of a brake operation interface. A pair of left and right operation levers, which constitute the operation interface, are provided on respective sides of a driver's seat, and the brake operation interface is provided on the left side of the driver's seat. The brake controller controls excitation current for putting the electromagnetic brake in the released state (excited) or the braking state (non-excited). The brake operation interface is switchable between a first position, which requests the electromagnetic brake to be put into the released state, and a second position, which requests the electromagnetic brake to be put into the braking state. The electromagnetic brake in the braking state (non-excited) defines and functions as a parking brake. The electromagnetic brake can also be forced to release mechanically without using electromagnetic force. Self-driving work vehicles according to the U.S. Pat. No. 6,708,805, the U.S. Pat. No. 10,850,622, and the like include brake devices that define and function as parking brakes, and therefore is capable of parking on slopes and the like. However, with the brake device according to the U.S. Pat. No. 6,708,805, deterioration of frictional plates that produce friction may result in wheels moving slightly, and the vehicle body moving as a result, even in the braking state. Additionally, with the brake device according to the U.S. Pat. No. 10,850,622, wheels may not be braked if the vehicle body is left unattended with the electromagnetic brake having been forcibly released by mistake. An object of the present invention is to provide a self-driving work vehicle that is capable of sensing abnormal situations in a parking brake that may cause problems such as a vehicle body moving unexpectedly while in a parked state.

SUMMARY OF THE INVENTION

A self-driving work vehicle of the present invention includes: a traveling apparatus; a vehicle body supported by the traveling apparatus on ground; a variable traveling power supply apparatus configured to supply rotational drive power to the traveling apparatus; a travel operation interface configured to adjust a rate of the rotational drive power; a parking brake provided for a transmission shaft of the variable traveling power supply apparatus; a rotation detector configured to detect rotation of the traveling apparatus or the transmission shaft; and a controller configured or programmed to: control the parking brake to a braking state or a non-braking state by a parking brake control module; manage the braking state or the non-braking state as a vehicle body state by a condition management module, the braking state and the non-braking state being operating states of the parking brake; and based on the vehicle body state and a result of the detection by the rotation detector, determine that the parking brake is in an abnormal state, by a brake abnormality determination module, in response to the rotation detector detecting the rotation while the parking brake is in the braking state.

According to this configuration, when rotation of the traveling apparatus or rotation of the transmission shaft of the variable traveling power supply apparatus is detected by the rotation detector while the operating state of the parking brake is determined to be the braking state by the vehicle body condition management module, the brake abnormality determination module determines that the parking brake is abnormal. This makes it possible for a control system of the self-driving work vehicle to take control measures in response to the abnormality in the parking brake.

In one preferred embodiment of the present invention, in the self-driving work vehicle, the controller is configured or programmed to: manage, by the condition management module, a main key ON operation as the vehicle body state; and determine, by the brake abnormality determination module, that the parking brake is in the abnormal state in response to the rotation detector detecting the rotation from a time of the main key ON operation to a time of a transition to the non-braking state of the parking brake.

In long-term parking, when a work apparatus is lowered to the ground surface, when a mechanical external stopping device such as a wheel stop is installed, or the like, it is important to determine that the parking brake is in abnormal until such factors, which stop the self-driving work vehicle, are removed and the vehicle is traveling again. Accordingly, in the foregoing configuration, it is preferable that an abnormality in the parking brake be determined from a time when the driver turns the main key of the self-driving work vehicle on to a time when the parking brake enters the non-braking state.

In one preferred embodiment of the present invention, in the self-driving work vehicle, the controller is configured or programmed to: manage, by the condition management module, a main key OFF operation as the vehicle body state; and determine, by the brake abnormality determination module, that the parking brake is in the abnormal state in response to the rotation detector detecting the rotation from a time of a transition to the braking state of the parking brake to a time of the main key OFF operation.

When the driver exits the vehicle, the driver stops the vehicle body, applies the parking brake, and turns the main key off. Exiting the vehicle in this manner is able to be used as an opportunity to determine that the parking brake is in the abnormal state.

In one preferred embodiment of the present invention, in the self-driving work vehicle, the controller is configured or programmed to determine, by the brake abnormality determination module, that the parking brake is in the abnormal state in response to an amount of the rotation exceeding a permitted rotation amount while the parking brake is in the braking state.

In the foregoing configuration, an abnormality in the parking brake can be determined from the rotational behavior of the transmission shaft of the traveling apparatus, the variable traveling power supply apparatus, or the like when the parking brake is in the braking state. The rotational behavior for accurately detecting a parking brake abnormality varies depending on the specifications of the traveling work vehicle. The rotation amount (rotation angle) is one rotational behavior that can be used as a reference for determining that the parking brake is in the abnormal state.

Rotational acceleration is one rotational behavior that can be used as a reference for determining that the parking brake is in the abnormal state. As such, in one preferred embodiment of the present invention, in the self-driving work vehicle, the controller is configured or programmed to determine, by the brake abnormality determination module, that the parking brake is in the abnormal state in response to a rotational acceleration of the rotation exceeding an acceleration threshold while the parking brake is in the braking state.

In one preferred embodiment of the present invention, in the self-driving work vehicle, the controller is configured or programmed to execute forcible stop processing in response to the brake abnormality determination module determining that the parking brake is in the abnormal state at a time when the self-driving work vehicle begins traveling.

When the vehicle starts traveling and an abnormality is determined in the parking brake, one control measure that can be taken by the control system of the self-driving work vehicle is to execute processing for forcibly stopping the vehicle body from traveling. According to the foregoing configuration, a problem in which the vehicle travels with an abnormal parking brake can be avoided, and inspections can be carried out. Such forcible stop processing includes turning the main key off, lowering the work apparatus, and the like, and appropriate control processing is selected according to the specifications of the self-driving work vehicle.

In one preferred embodiment of the present invention, in the self-driving work vehicle, the controller is configured or programmed to, in response to the brake abnormality determination module determining that the parking brake is in the abnormal state while the rotational drive power to the traveling apparatus is in a cut-off state, forcibly switch the rotational drive power from the cut-off state into a transmitted state.

Because an electric motor defines and functions as the drive source for traveling, with the foregoing configuration, if an abnormality is determined in the parking brake when a control position of the electric motor is a zero speed position, the controller is capable of stopping the vehicle by the electric motor generating rotational force in the direction opposite from the detected rotation direction. Furthermore, if a forward/reverse continuously-variable transmission mechanism is used and an abnormality is determined in the parking brake when the forward/reverse continuously-variable transmission mechanism is in a neutral state, the controller is capable of stopping the vehicle by adjusting the forward/reverse continuously-variable transmission mechanism so that the rotational force is transmitted in the direction opposite from the detected rotational direction.

Of course, when such an abnormality occurs in the parking brake, it is important to inform the driver to prompt the driver to perform maintenance and inspections. As such, in one preferred embodiment of the present invention, in the self-driving work vehicle, the controller is configured or programmed to, in response to the brake abnormality determination module determining that the parking brake is in the abnormal state, make a notification that an abnormality has occurred.

The above and other elements, features, steps, characteristics and advantages of the present invention will become more apparent from the following detailed description of the preferred embodiments with reference to the attached drawings.

DETAILED DESCRIPTION OF PREFERRED EMBODIMENTS

Preferred embodiments defining and functioning as examples of the present invention will be described hereinafter based on the drawings. Note that in the following descriptions, with respect to a riding-type mowing machine (an example of a "self-driving work vehicle"), the direction of arrow F in FIGS. 1 and 2 is a "vehicle body front", the direction of arrow B is a "vehicle body rear", the direction of arrow U in FIG. 1 is a "vehicle body top", the direction of arrow D is a "vehicle body bottom", the direction of arrow L in FIG. 2 is a "vehicle body left", and the direction of arrow R is a "vehicle body right".

Figure 1:
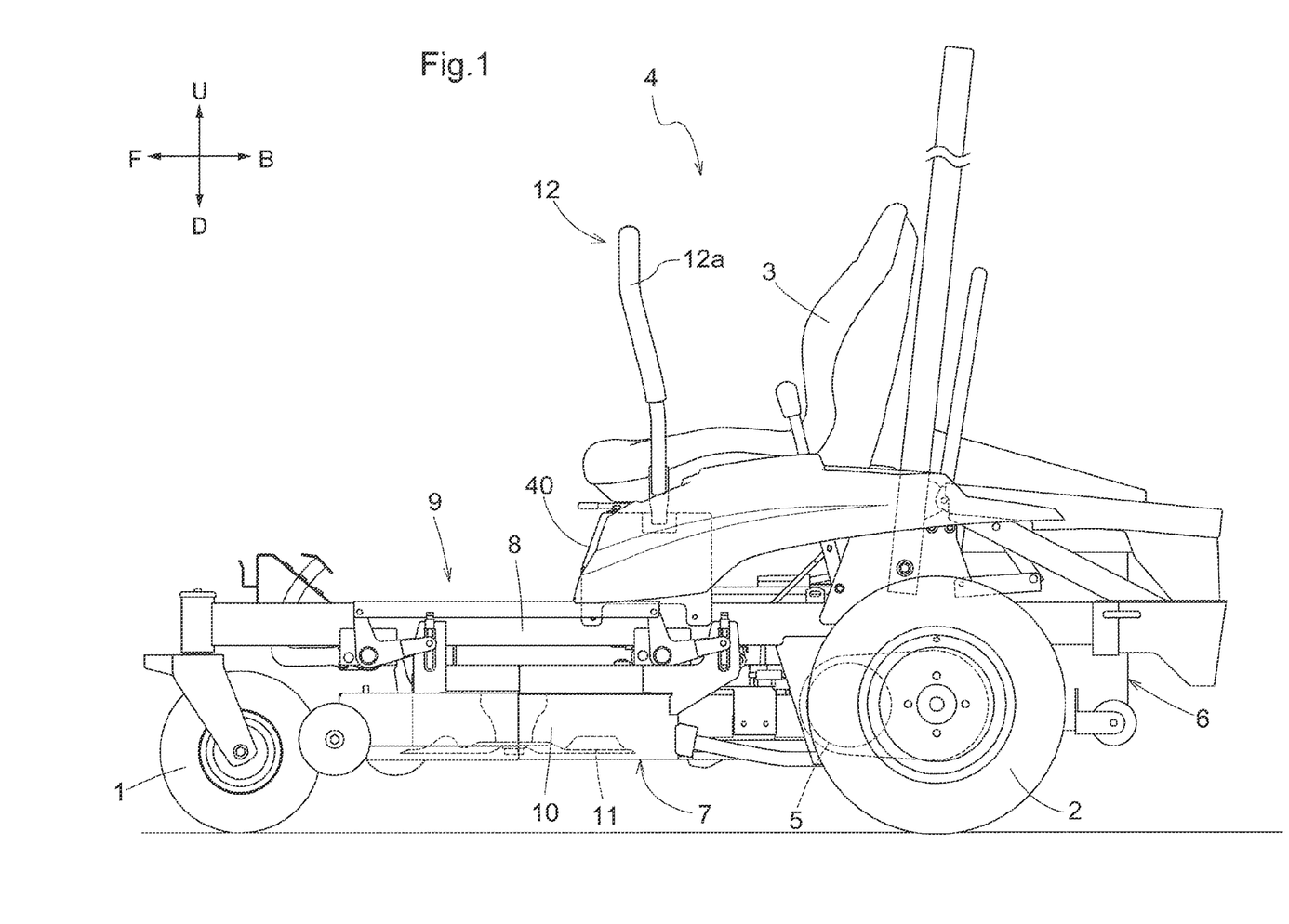
FIG. 1 is a left side view illustrating an overview of a riding-type mowing machine.
Figure 2:
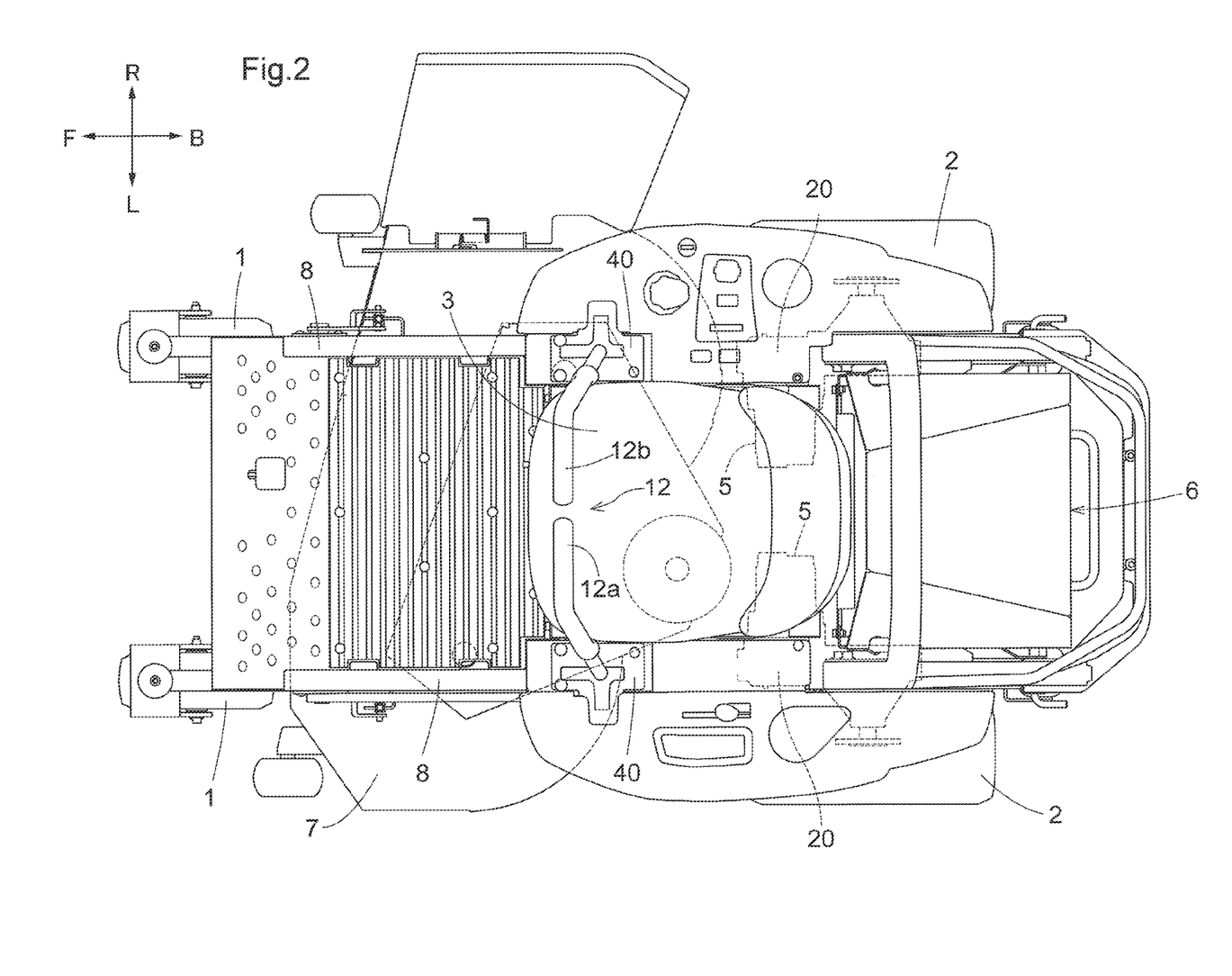
FIG. 2 is a plan view illustrating an overview of the riding-type mowing machine.

As illustrated in FIGS. 1 and 2, the riding-type mowing machine includes, as a traveling apparatus, left and right front wheels 1 and a rear wheel unit 2. The front wheels 1 are caster wheels. The rear wheel unit 2 has a left rear wheel and a right rear wheel which is drivable independently. The vehicle body has a vehicle body frame 8, and is supported by the traveling apparatus on ground. A driver's section 4 is provided at the front portion of the traveling vehicle body, and the driver's section 4 has a driver's seat 3. A travel motor unit 5 is provided below the driver's section 4. The travel motor unit 5 includes a left motor and a right motor. The left motor supplies rotational drive power to the left rear wheel, and the right motor supplies rotational drive power to the right rear wheel. In other words, the left motor and the right motor supply rotational drive power independently to the left rear wheel and the right rear wheel, respectively. A battery pack 6 is provided at the rear portion of the traveling vehicle body. The battery pack 6 supplies power to the travel motor unit 5. As illustrated in FIG. 2, a transmission 20 for traveling is provided in order to transmit drive power between the travel motor unit 5 and the rear wheel unit 2. A mowing apparatus 7 is provided between the front wheels 1 and the rear wheel unit 2. The mowing apparatus 7 is supported by the vehicle body frame 8 via a link mechanism 9. The link mechanism 9 lifts and lowers the mowing apparatus 7 relative to the traveling vehicle body. The mowing apparatus 7 includes a mowing blade housing 10 and a mowing blade 11. The mowing blade 11 is provided inside the mowing blade housing 10, and is capable of being rotationally driven with a support shaft (not shown), which is parallel to the vertical direction of the vehicle body, defining and functioning as the rotational center.

Figure 3:
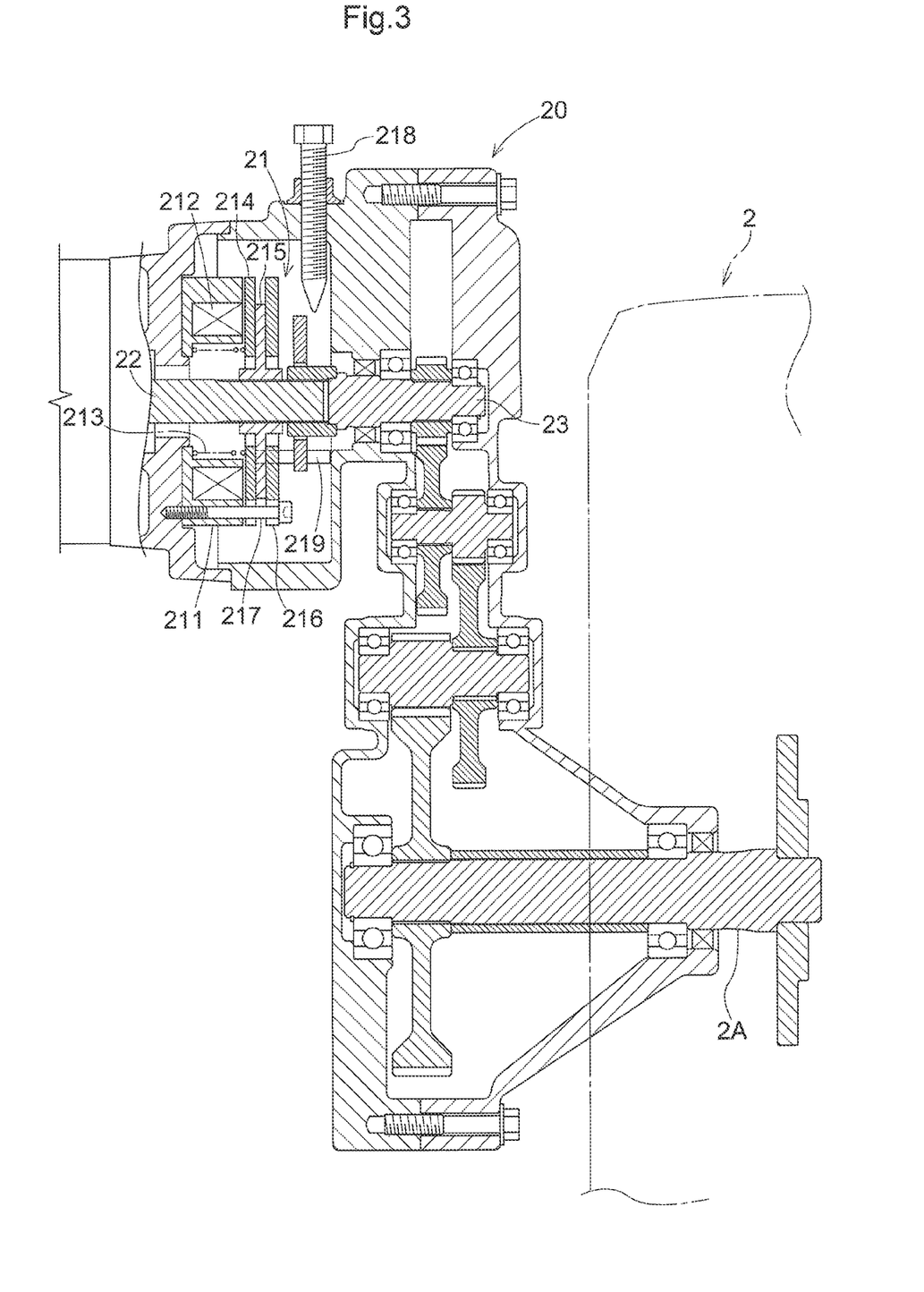
FIG. 3 is a longitudinal cross-sectional view of the structure of a transmission of the riding-type mowing machine.
Figure 4:
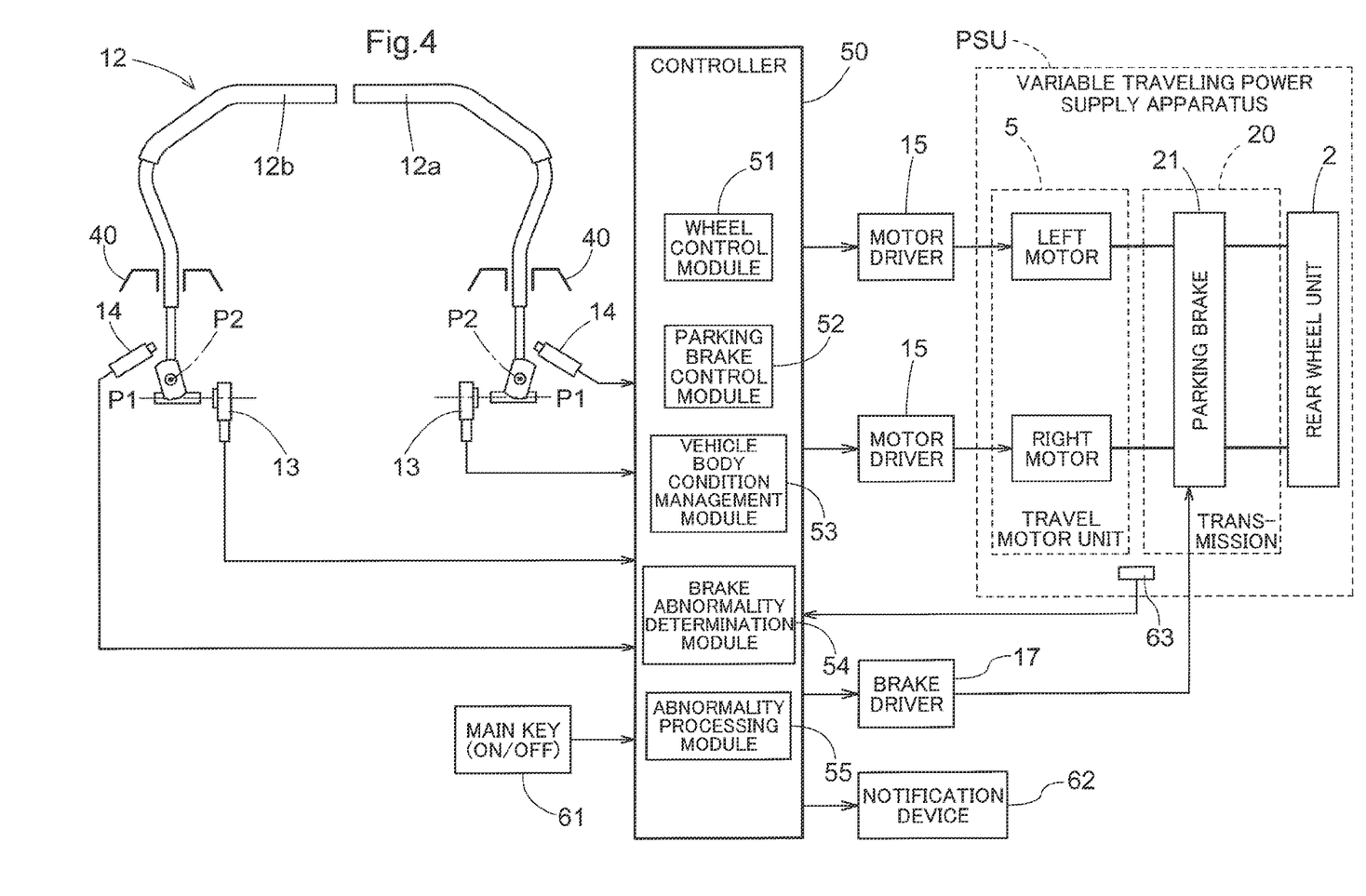
FIG. 4 is a function block diagram illustrating a control system of the riding-type mowing machine.

As illustrated in FIG. 3, a parking brake 21 is equipped in the transmission 20 for traveling. The parking brake 21 is a non-excitation actuated parking brake, and brakes the transmission of drive power from the travel motor unit 5 to the transmission 20. In this preferred embodiment, an output shaft of the travel motor unit 5 defines and functions as a rotation shaft 22 of the parking brake 21. The rotation shaft 22 is connected to an input shaft 23 of the transmission 20. Drive power input to the input shaft 23 of the transmission 20 is transmitted to a rear axle 2A through a gear transmission mechanism. The rear axle 2A is an output shaft of the transmission 20. As illustrated in FIG. 4, a variable traveling power supply apparatus PSU includes the travel motor unit 5, the parking brake 21, and the transmission 20. The rotation shaft 22 and the input shaft 23 illustrated in FIG. 3 are examples of transmission shafts of the variable traveling power supply apparatus PSU. The variable traveling power supply apparatus PSU transmits rotational drive power to the rear wheel unit 2.

The parking brake 21 includes a fixed core 211, an armature 214, a holding plate 216, and a brake disc 215. The fixed core 211 includes an electromagnetic coil 212 and a brake spring 213. The electromagnetic coil 212 and the brake spring 213 are arranged coaxially with the rotation shaft 22. The brake disc 215 is a circular disc, and frictional portions are formed on both surfaces thereof. The brake disc 215 also has a boss portion, and the boss portion is coupled and connected to the rotation shaft 22 so as not to be rotatable freely relative thereto. The armature 214 is a ring plate that is arranged coaxially with the rotation shaft 22 and is movable in an axial direction. The armature 214 is pressed against the brake disc 215 by the spring biasing force of the brake spring 213 when the electromagnetic coil 212 is not excited, and is separated from the brake disc 215 by electromagnetic force exceeding the spring biasing force when the electromagnetic coil 212 is excited. The holding plate 216 is a ring plate and is arranged coaxially with the rotation shaft 22. The holding plate 216 is connected to the fixed core 211 by connecting rods 217. The connecting rods 217 are distributed across three locations in the circumferential direction. A recess is provided in the outer circumference of the armature 214. The connecting rod 217 is fitted with the recess so as to define and function as a guide rod for axial direction movement and an anti-rotation rod for the armature 214 as well.

An operation implement 218 forcibly releases the parking brake 21 by human operation from outside. When the operation implement 218 displaces toward the rotation shaft 22, the wedge effect produced by a conical portion at the tip of the operation implement 218 causes a pressing body 219 to contact the armature 214, and the armature 214 moves toward the fixed core 211 consequently. As a result, the armature 214 separates from the brake disc 215, and the brake is released.

As illustrated in FIGS. 1 and 2, the driver's section 4 is provided with a travel operation interface 12. A driver adjusts the vehicle speed and heading of the traveling vehicle body while manipulating the travel operation interface 12. The travel operation interface 12 includes a left operation lever 12a (an example of a left operation interface) and a right operation lever 12b (an example of a right operation interface). The left operation lever 12a and the right operation lever 12b are provided on respective sides of the driver's seat 3. A floor plate is formed in front of the driver's seat 3. The driver gets on or off the vehicle by passing between the left operation lever 12a and the right operation lever 12b, and through the floor plate in front of the driver's seat 3.

As illustrated in FIG. 4, the left operation lever 12a and the right operation lever 12b both pivot and displace about a first pivot axis P1 in a front-back direction of the vehicle body. This pivoting displacement about the first pivot axis P1 is called "longitudinal displacement" hereinafter. The left operation lever 12a and the right operation lever 12b also pivot and displace about respective second pivot axes P2 in a lateral direction of the vehicle body. This pivoting displacement about the second pivot axes P2 is called "lateral displacement" hereinafter.

As illustrated in FIG. 4, guide units 40 are provided to ensure the travel operation interface 12 displaces (pivots) in a stable manner. Left and right guide units 40 guide the respective base ends of the left operation lever 12a and the right operation lever 12b. Each guide unit 40 is a plate structure, with a longitudinal guide slot 41 and a lateral guide slot 42 formed in an upper surface of the guide unit 40. The longitudinal guide slot 41 on the left side of the vehicle body guides the longitudinal displacement of the left operation lever 12a. The longitudinal guide slot 41 on the right side of the vehicle body guides the longitudinal displacement of the right operation lever 12b. The lateral guide slot 42 on the left side of the vehicle body guides the lateral displacement of the left operation lever 12a. The lateral guide slot 42 on the right side of the vehicle body guides the lateral displacement of the right operation lever 12b. The longitudinal guide slot 41 is connected to the lateral guide slot 42 in a central portion of the longitudinal guide slot 41.

Figure 5:
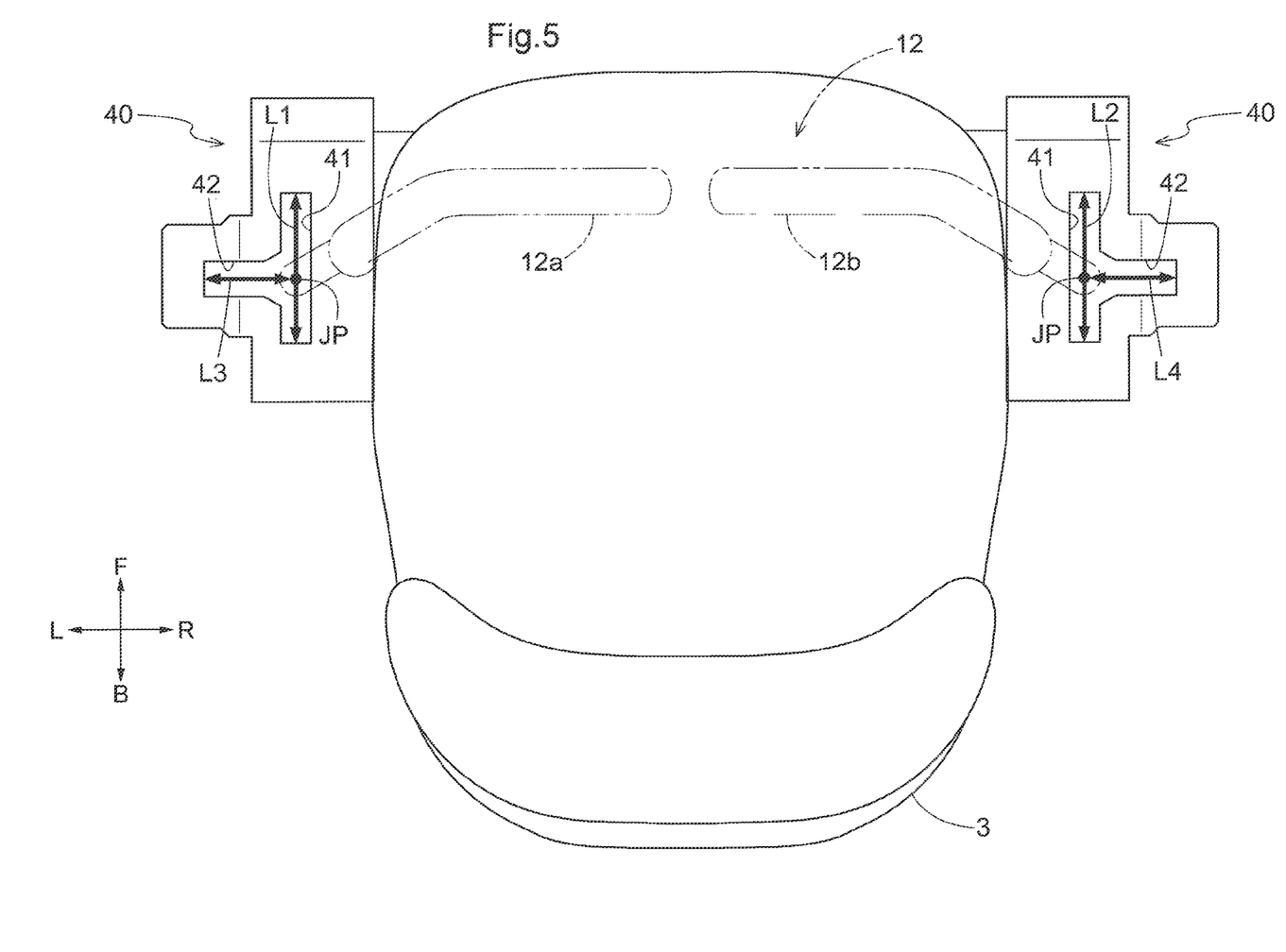
FIG. 5 is a plan view illustrating a guide unit that guides an operation lever.

As illustrated in FIG. 5, the left operation lever 12a is guided by the longitudinal guide slot 41 to displace longitudinally, and is guided by the lateral guide slot 42 to displace laterally. Additionally, the right operation lever 12b is guided by the longitudinal guide slot 41 to displace longitudinally, and is guided by the lateral guide slot 42 to displace laterally. A path of the longitudinal displacement of the left operation lever 12a will be called a first path L1, and a path of the longitudinal displacement of the right operation lever 12b will be called a second path L2. A path of the lateral displacement of the left operation lever 12a will be called a third path L3, and a path of the lateral displacement of the right operation lever 12b will be called a fourth path L4. The first path L1 and the third path L3 connect at a junction point JP. The second path L2 and the fourth path L4 connect at a junction point JP. The first path L1 and the third path L3 are orthogonal or substantially orthogonal at the junction point JP. The second path L2 and the fourth path L4 are orthogonal or substantially orthogonal at the junction point JP.

As illustrated in FIG. 4, a potentiometer 13 is provided near the base end of the left operation lever 12a. The potentiometer 13 on the left side of the vehicle body detects the longitudinal displacement of the left operation lever 12a along the first path L1. Likewise, a potentiometer 13 is provided near the base end of the right operation lever 12b. The potentiometer 13 on the right side of the vehicle body detects the longitudinal displacement of the right operation lever 12b along the second path L2. Each potentiometer 13 is connected to a controller 50, and data of respective displacement amounts of the left operation lever 12a and the right operation lever 12b are transmitted to the controller 50.

Furthermore, a limit switch 14 is provided near the base end of the left operation lever 12a. The limit switch 14 on the left side of the vehicle body detects the left operation lever 12a being positioned in a specific position (a first detection position) set in the third path L3. Likewise, a limit switch 14 is provided near the base end of the right operation lever 12b. The limit switch 14 on the right side of the vehicle body detects the right operation lever 12b being positioned in a specific position (a second detection position) set in the fourth path L4. Each limit switch 14 is connected to the controller 50, and detection signals from the limit switches 14 are transmitted to the controller 50.

Signals from a main key 61, a notification device 62, and a rotation detector 63 are inputted to the controller 50. The main key 61 is switchable to at least an ON operating position and an OFF operating position. In the ON operating position, the vehicle body enters an energized state and the traveling of the vehicle body is enabled. In the OFF operating position, the traveling of the vehicle body is disabled. The notification device 62 includes a monitor, a buzzer, a lamp, a speaker, or the like, and notifies the driver of information generated by the controller 50. The rotation detector 63 detects rotation of the rear wheel unit 2 or detects rotation of the rotation shaft 22.

The controller 50 illustrated in FIG. 4 includes a wheel control module 51, a parking brake control module 52, a vehicle body condition management module 53, a brake abnormality determination module 54, and an abnormality processing module 55. The travel motor unit 5 is connected to the controller 50 via a motor driver 15. As described above, the travel motor unit 5 supplies rotational drive power to the rear wheel unit 2, and the travel motor unit 5 includes a left motor and a right motor. The motor driver 15 includes a left driver for the left motor and a right driver for the right motor. The wheel control module 51 generates control signals for the motor driver 15, and independently controls the driving of the left and right rear wheels of the rear wheel unit 2.

The wheel control module 51 controls the rotation of the travel motor unit 5 based on the longitudinal displacement of the travel operation interface 12. Specifically, the further the left operation lever 12a displaces forward from the junction point JP in the first path L1, the higher the forward rotation speed of the left rear wheel becomes. Additionally, the further the left operation lever 12a displaces rearward from the junction point JP in the first path L1, the higher the reverse rotation speed of the left rear wheel becomes. Likewise, the further the right operation lever 12b displaces forward from the junction point JP in the second path L2, the higher the forward rotation speed of the right rear wheel becomes. Additionally, the further the right operation lever 12b displaces rearward from the junction point JP in the second path L2, the higher the reverse rotation speed of the right rear wheel becomes. The position of the junction point JP of the left operation lever 12a, and the position of the junction point JP of the right operation lever 12b, are neutral positions where drive power is not supplied to the travel motor unit 5. A state in which drive power is not supplied to the travel motor unit 5 is called a "neutral state" hereinafter.

Each junction point JP defines and functions as a neutral position where the transmission of rotational drive power to the rear wheel unit 2 is set to zero. Accordingly, when the left operation lever 12a is positioned in the third path L3, the transmission of rotational drive power to the left rear wheel is zero and the neutral state is maintained. Likewise, when the right operation lever 12b is positioned in the fourth path L4, the transmission of rotational drive power to the left rear wheel is zero and the neutral state is maintained.

The parking brake control module 52 is connected to the parking brake 21 via a brake driver 17. The parking brake control module 52 controls the parking brake 21 to a braking state or a non-braking state by transmitting control signals to the brake driver 17. The braking state or the non-braking state, which means operating states of the parking brake 21, are managed by the vehicle body condition management module 53 as one of vehicle body states.

When the left operation lever 12a reaches the first detection position to turn the left-side limit switch 14 on, and the right operation lever 12b reaches the second detection position to turn the right-side limit switch 14 on, the parking brake control module 52 causes a left brake and a right brake of the parking brake 21 to operate (brake on). As a result, the parking brake 21 operates and the traveling vehicle body enters a parked state.

When the vehicle body condition management module 53 detects that the parking brake 21 is in the braking state, and the rotation detector 63 detects rotation of at least one of the left and right rear wheels of the rear wheel unit 2 or rotation of the rotation shaft 22, the brake abnormality determination module 54 determines that the parking brake 21 is in abnormal. A state that the parking brake 21 is in abnormal is called "abnormal state" hereinafter. The rotation detector 63 detecting rotation means not that slippage is occurring, but rather than the wheels are rotating and the vehicle body is moving. The vehicle body moving in such a manner despite the parking brake 21 being in the braking state indicates that the parking brake 21 is not functioning properly, and thus the parking brake 21 is determined to be the abnormal state.

Examples of algorithms by which the brake abnormality determination module 54 determines that the parking brake 21 is in the abnormal state will be described below.

(1) When rotation is detected by the rotation detector 63 from a time of an ON operation of the main key 61 to a time of a transition to the non-braking state of the parking brake 21, the parking brake 21 is determined to be the abnormal state.

(2) When rotation is detected by the rotation detector 63 from a time of a transition to the braking state of the parking brake 21 to a time of an OFF operation of the main key 61, the parking brake 21 is determined to be the abnormal state.

(3) When rotation detected by the rotation detector 63 exceeds a permitted rotation amount while the parking brake 21 is in the braking state, the parking brake 21 is determined to be the abnormal state.

(4) When rotational acceleration of rotation detected by the rotation detector 63 exceeds an acceleration threshold while the parking brake 21 is in the braking state, the parking brake 21 is determined to be the abnormal state.

When the brake abnormality determination module 54 determines that the parking brake 21 is in the abnormal state, the abnormality processing module 55 executes a predetermined abnormality transaction. First, as the abnormality transaction, the driver is notified that the abnormality has occurred through the notification device 62. In the case of a structure in which self-braking activates in response to the main key 61 being turned off, the main key 61 is automatically turned off. When the mowing apparatus 7 is capable of being automatically lowered to the ground, the automatic lowering produces friction between the ground surface and the mowing apparatus 7, which forces the vehicle body to stop. Additionally, when the parking brake 21 is determined to be the abnormal state during a state in which rotational drive power to the rear wheel unit 2 is cut off, the cut-off state of the rotational drive power is forcibly switched to a transmitted state. Through this, the driver, for example, maneuvers the travel operation interface 12 in the opposite direction of the direction in which the vehicle body is unexpectedly moving, which generates a rotational force in the electric motor in the opposite direction from the direction of the detected rotation and effectively stops the vehicle body.

Additional Preferred Embodiments

The present invention is not limited to the configuration described as an example in the foregoing preferred embodiment, and examples of other representative preferred embodiments of the present invention will be given hereinafter.

(1) In the foregoing preferred embodiment, the front wheels 1 and the rear wheel unit 2 are provided as a traveling apparatus, and the travel motor unit 5 is provided as a drive device that drives the traveling apparatus. However, the configuration is not limited thereto. For example, a crawler-type traveling apparatus, a traveling apparatus that combines mini crawlers and wheels, or the like may be provided instead. Additionally, a continuously-variable stepless transmission device that drives the traveling apparatus by inputting drive power from an engine, shifting the input drive power, and transmitting the drive power to the traveling apparatus may be provided.

(2) In the foregoing preferred embodiment, the parking brake 21 is constituted by an electromagnetic brake. However, another brake structure may be employed instead, such as a mechanical brake operated by an electric actuator.

(3) In the foregoing preferred embodiment, an operation lever that pivots about a pivot fulcrum is described as the travel operation interface 12. However, another type, such as a sliding type travel operation interface 12, may be used instead.

(4) In the foregoing preferred embodiment, limit switch-type or potentiometer-type detection devices are used to detect the behavior of the travel operation interface 12 in each path. However, magnetic detection devices, optical detection devices, or the like may be used instead.

(5) The divisions of the functional portions in the function block diagram in FIG. 4 are merely an example for illustrative purposes, and various functional portions may be integrated, a single functional portion may be divided into a plurality of portions, and the like.

(6) In the foregoing preferred embodiment, the electric traveling vehicle is a mowing machine, but may instead be an agricultural machine such as a tractor, a combine, a rice transplanter, or the like. Furthermore, the present invention can be applied in off-road vehicles such as military vehicles, commercial off-road vehicles, etc.

The present invention can be applied in a self-driving work vehicle including a parking brake.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:
1. A self-driving work vehicle, comprising:
a traveling apparatus;
a vehicle body supported by the traveling apparatus on ground;
a variable traveling power supply apparatus configured to supply rotational drive power to the traveling apparatus;
a travel operation interface configured to adjust a rate of the rotational drive power;
a parking brake provided for a transmission shaft of the variable traveling power supply apparatus;
a rotation detector configured to detect rotation of the traveling apparatus or the transmission shaft; and
a controller configured or programmed to:
control the parking brake to a braking state or a non-braking state by a parking brake control module;
manage the braking state or the non-braking state as a vehicle body state by a condition management module, the braking state and the non-braking state being operating states of the parking brake;
based on the vehicle body state and a result of the detection by the rotation detector, determine that the parking brake is in an abnormal state, by a brake abnormality determination module, in response to the rotation detector detecting the rotation while the parking brake is in the braking state; and
in response to the brake abnormality determination module determining that the parking brake is in the abnormal state while the rotational drive power to the traveling apparatus is in a cut-off state, forcibly switch the rotational drive power from the cut-off state into a transmitted state.

2. The self-driving work vehicle according to claim 1, wherein the controller is configured or programmed to determine, by the brake abnormality determination module, that the parking brake is in the abnormal state in response to an amount of the rotation exceeding a permitted rotation amount while the parking brake is in the braking state.

3. The self-driving work vehicle according to claim 1, wherein the controller is configured or programmed to determine, by the brake abnormality determination module, that the parking brake is in the abnormal state in response to a rotational acceleration of the rotation exceeding an acceleration threshold while the parking brake is in the braking state.

4. The self-driving work vehicle according to claim 1, wherein the controller is configured or programmed to execute forcible stop processing in response to the brake abnormality determination module determining that the parking brake is in the abnormal state at a time when the self-driving work vehicle begins traveling.

5. The self-driving work vehicle according to claim 1, wherein the controller is configured or programmed to, in response to the brake abnormality determination module determining that the parking brake is in the abnormal state, make a notification that an abnormality has occurred.

6. A self-driving work vehicle comprising:
a traveling apparatus;
a vehicle body supported by the traveling apparatus on ground;
a variable traveling power supply apparatus configured to supply rotational drive power to the traveling apparatus;
a travel operation interface configured to adjust a rate of the rotational drive power;
a parking brake provided for a transmission shaft of the variable traveling power supply apparatus;
a rotation detector configured to detect rotation of the traveling apparatus or the transmission shaft; and a controller configured or programmed to:
- control the parking brake to a braking state or a non-braking state by a parking brake control module;
- manage the braking state or the non-braking state as a vehicle body state by a condition management module, the braking state and the non-braking state being operating states of the parking brake;
- manage, by the condition management module, a main key ON operation capable of driving of the traveling apparatus and a main key OFF operation incapable of driving of the traveling apparatus as the vehicle body state;
- based on the vehicle body state and a result of the detection by the rotation detector, determine that the parking brake is in an abnormal state, by a brake abnormality determination module, in response to the rotation detector detecting the rotation while the parking brake is in the braking state; and
- determine, by the brake abnormality determination module, that the parking brake is in the abnormal state in response to the rotation detector detecting the rotation from a time of the main key ON operation to a time of a transition to the non-braking state of the parking brake.

7. A self-driving work vehicle comprising:
a traveling apparatus;
a vehicle body supported by the traveling apparatus on ground;
a variable traveling power supply apparatus configured to supply rotational drive power to the traveling apparatus;
a travel operation interface configured to adjust a rate of the rotational drive power;
a parking brake provided for a transmission shaft of the variable traveling power supply apparatus;
a rotation detector configured to detect rotation of the traveling apparatus or the transmission shaft; and
a controller configured or programmed to:
- control the parking brake to a braking state or a non-braking state by a parking brake control module;
- manage the braking state or the non-braking state as a vehicle body state by a condition management module, the braking state and the non-braking state being operating states of the parking brake;
- manage, by the condition management module, a main key ON operation capable of driving of the traveling apparatus and a main key OFF operation incapable of driving of the traveling apparatus as the vehicle body state;
- based on the vehicle body state and a result of the detection by the rotation detector, determine that the parking brake is in an abnormal state, by a brake abnormality determination module, in response to the rotation detector detecting the rotation while the parking brake is in the braking state; and
- determine, by the brake abnormality determination module, that the parking brake is in the abnormal state in response to the rotation detector detecting the rotation from a time of a transition to the braking state of the parking brake to a time of the main key OFF operation.

* * * * *